A. B. MOORE.
BRUSH HOLDER.
APPLICATION FILED JULY 24, 1915.
1,273,647.
Patented July 23, 1918.
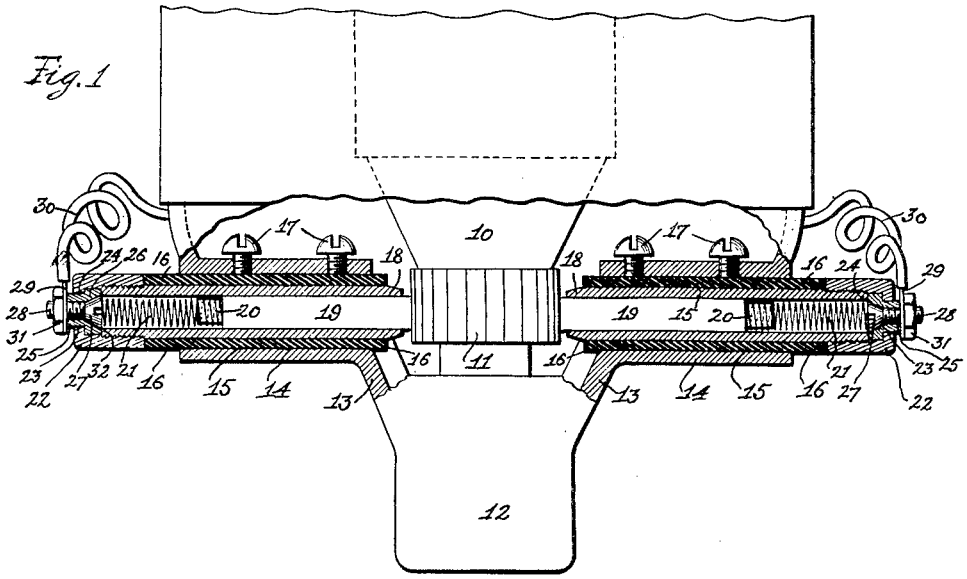
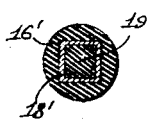
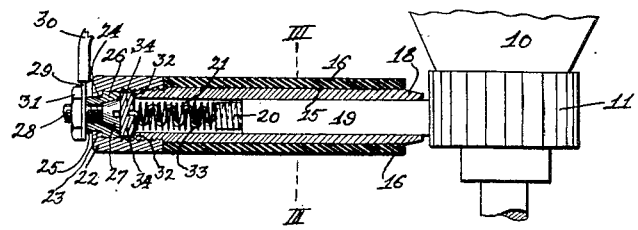
Inventor
Albert B. Moore,
By W. C. Schoenborn
Attorney

UNITED STATES PATENT OFFICE.

ALBERT B. MOORE, OF ROSELLE, NEW JERSEY.

BRUSH-HOLDER.

1,273,647.   Specification of Letters Patent.   Patented July 23, 1918.

Application filed July 24, 1915. Serial No. 41,727.

*To all whom it may concern:*

Be it known that I, ALBERT B. MOORE, a citizen of the United States, residing at Roselle, in the county of Union and State of New Jersey, have invented certain new and useful Improvements in Brush-Holders, of which the following is a specification.

This invention relates to brush-holders and more particularly to an improved construction for supporting the brushes of small electric machines such as motors and generators.

One of the objects of the invention is to provide an arrangement in which it will be possible to make practically perfect electrical contact between the flexible leads to the brushes and the brush tube without the use of solder or any tools.

A further object of the invention is to provide a brush-holder which is so mounted on the frame of the machine that it can be removed without special manipulation, such as unsoldering joints, for instance.

Another object of the invention is to construct a brush-holder from which the brushes and the springs which hold them against the commutator may be readily removed for cleaning and renewing the same.

The above and other objects and the novel features of my invention will be apparent from the following description taken in connection with the drawing in which:

Figure 1 is a view of the end of a dynamo-electric machine equipped with brush-holders embodying my invention, the brush-holders and parts of the frame in which they are mounted being shown in section;

Fig. 2 is a longitudinal sectional view of another form of brush-holder embodying my invention;

Fig. 3 is a transverse sectional view on the line III—III of Fig. 2, and

Fig. 4 is a view similar to Fig. 3 illustrating a different form of brush tube, and may also represent a section on the line 3—3 of Fig. 2.

Referring to the drawing, 10 designates an armature of an electric machine such as a motor or generator. The shaft of the armature 10 also carries the usual commutator 11, and has bearing in the box 12 which is connected to the main body of the machine frame by arms 13 or other suitable means, preferably cast integral with the box 12.

The arms 13 which carry the brush holders and brushes are usually located on diametrically opposite sides of the commutator 11, and have enlarged portions thereon intermediate the main frame and the box 12. The enlarged portions 14 of the arms 13 are provided with holes 15, the axes of which may be arranged radially to the commutator 11. Since the brush-holders on opposite sides of the commutator are alike, it will be necessary to describe only one of them.

The hole 15 extends transversely of the arm or plate 13 and provides an elongated cavity to receive the tube 16 of fiber or other suitable insulating material. The tube 16 snugly fits the hole 15, is of sufficient length to extend beyond the ends of the enlargement 14 and is held in place in the hole 15 by the set screws 17 carried by the enlargement 14. A brass brush-tube 18 snugly fits the interior of the insulating tube 16 and extends beyond the opposite ends of the latter. In the form shown in section in Fig. 3 the metal brush tube 18 is circular in outline on the outside and has a square bore. In Fig. 4 I have illustrated another form of insulating tube 16' in which is fitted a metal brush tube 18' which is square inside and outside. Either form of construction is satisfactory as it is simply necessary that the form of the bore of the brush tube 16 or 16' conform to the shape of the brush 19, of carbon or other suitable material. The form of brush tube 18' shown in Fig. 4 has the advantage that the brush tube will not turn in the insulating tube.

As shown the brush 19 is square so as to slidingly fit the brush tube 18, and it has a portion 20 at its inner end which is round and reduced in section to fit in the end of a spiral spring 21 which when compressed forces the brush 19 into yielding engagement with the commutator 11.

A screw cap 22 closes the outer end of the brush tube 18 and has threads on the interior thereof which fit threads on the outside of the tube 18. The outer surface of the cap is knurled to provide a grip for turning it, and the end wall of the cap has a central opening 23 therein which is surrounded on the inside by a beveled shoulder 24.

A brass bushing or sleeve has a part 25 which is of slightly smaller diameter than the hole 23 and a head 26 abutting against the shoulder 24 in the cap. The head 26 has a counter-sunk recess to receive the tapering head of the screw 27, the shank 28 of which passes through the central hole in the bushing and projects outside the cap and beyond the outer end of the bushing.

A lug or tip 29 on the end of the flexible lead 30 slips on the shank of the screw and a nut 31 fitting the screw serves to clamp the tip 29 against the end of the bushing which keeps the tip from binding against the cap. Since the bushing is free to turn the lead may be adjusted in any position desired and locked in that position by screwing the cap onto the end of the brush tube 18 until the head 26 of the bushing and the head 27 of the screw bear against the shoulder 32 formed by the end of the tube 18. The threads on the cap 22 and tube 18 are sufficient so that the heads 26 and 27 may be tightly clamped between the shoulders 24 and 32 so as to prevent the turning of the lead or tip. Moreover, the swivel connection between the lead and cap permits the cap to be turned without twisting or effecting the lead, the cap acting as a clamp to force the lead connection into contact with the brush tube 18. The end of the insulating tube 16 serves as a stop for the cap.

Where it is not satisfactory to depend on the surface contact between the brush tube and brush, the brushes may be provided with pigtails, such as the pigtail 33 shown in Fig. 2. One end of the flexible pigtail conductor 33 is connected to the end of the brush and the other end of the pigtail is attached or soldered to a metal contact disk 34 which is clamped against the end 32 of the tube 18 and against the heads 26 and 27 when the cap 22 is screwed on the tube 18. When the cap is not screwed down, the spring 21 will hold the disk 34 against the swivel connection consisting of the bushing and screw, thereby maintaining the electrical connection between the swiveling bushing and the commutator brush. In the form shown in Fig. 2 the spring 21 surrounds the pigtail 33.

From the foregoing description it will be seen that I have provided a type of brush holder in which the brushes may be renewed without the use of tools and at the same time perfect contact between the brush support or tube itself and the connection to the motor is afforded.

The principal feature is that the brush tube cap is permanently attached to the motor lead by means of a swivel connection which permits of the cap being removed by unscrewing it from the tube without removing the lead from the motor and without danger of twisting the lead. The connection also affords perfect metallic contact with the end of the brush tube when the cap is screwed on in place.

While I have shown and described the brush holder construction in detail it is to be understood that various modifications may be made in the form of the same without departing from the spirit of the invention and therefore I do not wish to be limited to the exact construction disclosed.

It will also be seen that owing to the yielding nature of the fiber or hard rubber with which the insulating tube 16 is made, compared with the metal of the screw cap 22, that when said cap 22 is screwed up against the outer end of said tube 16, the slight yielding of the end of the tube 16 adjacent to the cap 22 locks them together to such a degree that the screw cap 16 is firmly held in engagement with the threads on the outside of the tube 18, and prevents any possibility of the good electrical contact and connection between the brush holder and flexible lead 30 from being destroyed.

What I claim is:

1. In a brush-holder, the combination with a brush tube, of an adjustable connecting device to which a lead may be connected on its end, and a cap detachably mounted on the end of said tube and adapted to clamp said device in position thereon, said device and cap being swiveled together whereby the cap may be turned independently of said device in attaching it to the tube.

2. In a brush-holder, the combination with a brush tube, of a commutator brush in said tube and slidable longitudinally thereof, a spring in said tube tending to press said brush outwardly from one end thereof, a swiveled and independent member closing the opposite end of said tube and bearing against one end of said spring and provided at its other end with means for connecting with a lead and a cap fitting said tube and adapted to surround and hold said swiveled member in place.

3. In a brush-holder, the combination with a brush tube, of a screw cap fitting the end of said tube, said cap having an opening in one wall thereof, a headed connection member adapted to be clamped in place by said cap, the head of said member being inside said cap and the shank thereof extending out of the cap through said opening, and means at the outer end of said shank for attaching a lead thereto.

4. In a brush-holder, the combination with a brush tube, of a commutator brush in said tube, a spring in said tube tending to press said brush outwardly from one end thereof, an independent swiveled connecting device to which a lead is adapted to be attached, and a cap fitting one end of said tube and rotatable thereon, said cap being adapted to surround and clamp said swiveled connecting device on said tube and being rotatable independently of said device, said cap being also adapted to compress said spring when the cap is fitted in the tube.

5. In a brush-holder, the combination with a brush tube, of a commutator brush in said tube, a flexible conductor attached at one end of said brush, a contact disk attached to the other end of said conductor, a spring in said tube tending to press said brush outwardly from one end of the tube, a bushing, means for attaching a lead to said bushing, and a screw cap fitting the end of said tube and swiveled on said bushing, said cap being adapted to clamp said bushing in contact with said disk.

6. In a brush-holder, the combination with a frame member provided with an opening, of an insulating lining for said opening, a brush tube in said insulating lining, an independent swiveled connecting device to which a lead is adapted to be attached and a device secured at the outer end of said tube serving as a clamp for the swiveled connecting device and also as a stop to prevent the inward movement of said brush tube.

7. In a brush-holder, the combination with an insulating tube, of a brush tube fitting inside said insulating tube, a swiveled and independent connecting member to which a lead is adapted to be attached, and a clamping device fitting and screwing on said brush tube and adapted to surround and clamp said swiveled connecting member to said brush tube, the end of said insulating tube serving as a stop and lock for said clamping device.

8. In a brush-holder, the combination with a yielding insulating tube, of a brush tube fitting inside said insulating tube, a brush in said tube, an independent and swiveled member to which a lead is adapted to be attached and electrically connected with said brush, and a clamping device fitting and removably secured to said brush tube and adapted to surround and clamp said swiveled member to said brush tube, the end of said insulating tube serving as a stop for said brush tube and lock for said clamping device.

In testimony whereof I affix my signature in the presence of two witnesses.

ALBERT B. MOORE. [L. S.]

Witnesses:
HERMAN ANDERSON,
ANNA McQUILKIN.